United States Patent
Kinoshita

(10) Patent No.: US 7,273,033 B2
(45) Date of Patent: Sep. 25, 2007

(54) ENGINE CONTROL DEVICE

(75) Inventor: Yoshimasa Kinoshita, Hamamatsu (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/082,792

(22) Filed: Mar. 17, 2005

(65) Prior Publication Data

US 2006/0081215 A1    Apr. 20, 2006

(30) Foreign Application Priority Data

Oct. 20, 2004  (JP)  ............... 2004-305096

(51) Int. Cl.
- F02P 5/15    (2006.01)
- F02D 41/06   (2006.01)
- F02D 41/16   (2006.01)
- F02D 29/02   (2006.01)

(52) U.S. Cl. ............ 123/339.11; 123/352; 123/406.47; 123/406.54; 123/491

(58) Field of Classification Search ........... 123/339.11, 123/339.12, 352–355, 406.47, 406.53, 406.54, 123/478, 480, 491

See application file for complete search history.

(56) References Cited

U.S. PATENT DOCUMENTS

| | | | | |
|---|---|---|---|---|
| 4,777,924 A | * | 10/1988 | Fujimura et al. ........... | 123/678 |
| 5,280,772 A | * | 1/1994 | Weber et al. ........... | 123/339.11 |
| 5,701,871 A | * | 12/1997 | Munakata et al. .......... | 123/491 |
| 5,727,522 A | * | 3/1998 | Otani et al. ............ | 123/339.11 |
| 6,474,307 B1 | * | 11/2002 | Ohuchi et al. ............... | 123/491 |
| 6,520,147 B1 | * | 2/2003 | Kanno ................... | 123/339.23 |

FOREIGN PATENT DOCUMENTS

JP    2004-137920    5/2004

* cited by examiner

Primary Examiner—T. M. Argenbright
(74) Attorney, Agent, or Firm—Knobbe, Martens, Olson & Bear LLP

(57) ABSTRACT

An engine control device can be capable of suppressing a rise in engine speed at starting. The engine speed can be detected by a speed sensor and a determination can be made whether the engine speed has changed from a starting mode to a normal mode. If the engine speed has changed from a starting mode to a normal mode, the difference between the engine speed and a predetermined target engine speed is calculated, and the ignition timing is controlled based on the calculated difference. The control of ignition timing can be performed when the detected value of the rotational sensor is larger than the target engine speed.

16 Claims, 6 Drawing Sheets

ENGINE CONTROL DEVICE

PRIORITY INFORMATION

This application is based on and claims priority under 35 U.S.C. §119 to Japanese Patent Application No. 2004-305096, filed on Oct. 20, 2004, the entire contents of which is hereby expressly incorporated by reference herein.

BACKGROUND OF THE INVENTIONS

1. Field of the Inventions

The present inventions relate to an engine control device for suppressing a rise in engine speed when an engine is started.

2. Description of the Related Art

In a vehicle such as a small watercraft or a automobile equipped with an engine, the engine may make a noise or vibrate because of an abrupt rise of the engine speed at starting. Various devices and methods have been developed to suppress such an abrupt rise in engine speed at starting.

One such system utilizes a method in which some of the cylinders are stopped or the fuel supply to the engine is cut off during starting. The device includes a start detector for detecting engine start, a warming-up condition detector for detecting the warming-up condition of the engine, and a controller. When the start detector detects an engine start, the controller controls the engine such that some cylinders are prevented from firing until appropriate conditions are detected by the warming-up condition detector. This allows suppression of an abrupt rise in engine speed at starting.

SUMMARY OF THE INVENTIONS

An aspect of at least one of the embodiments disclosed herein includes the realization that if engine speed is suppressed during startup by disabling one or more of the cylinders of a marine engine, in which water can be mixed with exhaust gas before being discharged, water can be drawn through the exhaust system toward the engine, due to exhaust pulsation. This may result in damage to the engine. Additionally, other types of engines can also be damaged by cylinder deactivation during low speed, startup, or idle speed operation.

Thus, in accordance with an embodiment, an engine control device is provided. The engine control device can comprise a rotational speed detection device for detecting an engine speed of an engine. A mode judgment device can be configured to determine from a detection value of the rotational speed detection device that the engine speed has been changed from a starting mode to a normal mode. Additionally, an ignition timing control device can be configured to calculate, when the mode judgment device determines that the engine speed has been changed from the starting mode to the normal mode, the difference between the detection value of the rotational speed detection device and a predetermined target engine speed and to control the ignition timing based on the calculated value.

In another embodiment, an engine control device is provided. The engine control device can comprise a rotational speed detection device configured to detect an engine speed of an engine and to output an engine speed value. A mode judgment device can be configured to determine, from the engine speed value of the rotational speed detection device, whether the engine speed has changed from a starting mode to a normal mode. Additionally, a fuel injection control device can be configured to control a fuel injection quantity supplied to the engine and to limit the fuel injection quantity to a value no larger than a predetermined upper limit of fuel injection, when the mode judgment device determines that the engine speed has changed from a starting mode to a normal mode.

In yet another embodiment, a method for controlling the speed of an engine is provided. The method can include detecting an engine speed, determining whether the engine speed has changed from a starting mode to a normal mode, and calculating a difference between the engine speed and a predetermined target engine speed. The method can also include controlling an ignition timing of the engine based on the calculated difference between the engine speed and the predetermined target engine speed.

BRIEF DESCRIPTION OF THE DRAWINGS

These and other features and advantages of the inventions, features, aspects, and embodiments will become more apparent upon reading the following detailed description and with reference to the accompanying drawings of an embodiment that exemplifies the invention. The drawings comprise eight figures.

DETAILED DESCRIPTION OF THE PREFERRED EMBODIMENTS

Figure 1:
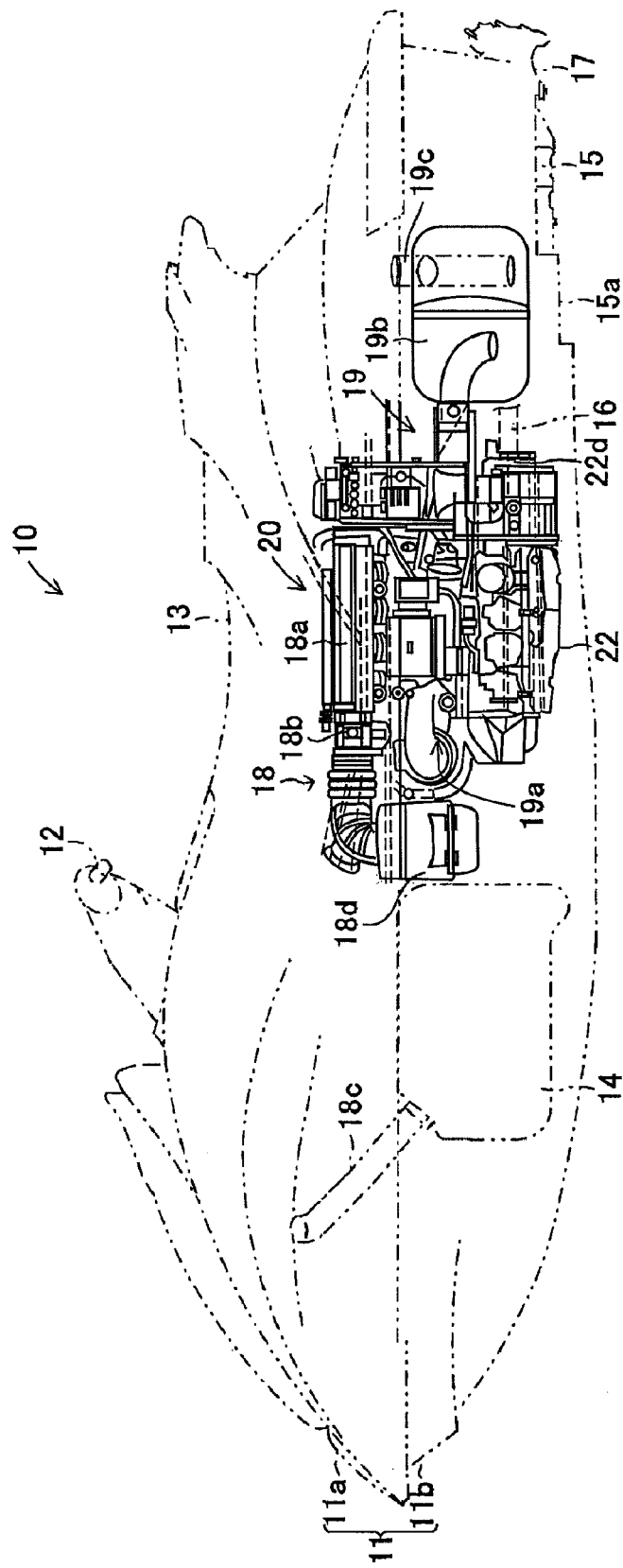
FIG. 1 is a side elevational view of a small watercraft with an engine control device according to an embodiment.

An embodiment is described below with reference to the drawings. FIG. 1 shows a personal water-jet propulsion watercraft 10 with an engine control device 20. The embodiments disclosed herein are described in the context of a personal watercraft because these embodiments have particular utility in this context. However, the embodiments and inventions herein can also be applied to other marine vessels, such as and small jet boats, as well as other vehicles.

With reference to FIG. 1, in the boat 10, a boat body 11 is formed of a deck 11a and a lower hull 11b. A steering handle 12 is provided in the upper part of the boat body 11 at a portion, forwardly of the center. A seat 13 is provided in the upper part of the boat body 11 at about the middle of the boat 10. The steering handle 12, also shown in FIG. 2, is mounted to the upper end of a steering shaft 12a provided in the boat body 11, for rotation about or with the steering shaft 12a.

Figure 2:
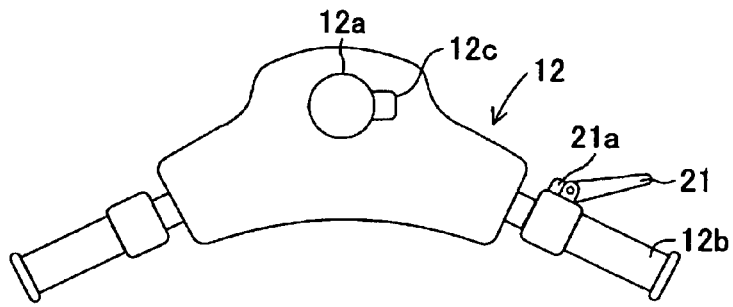
FIG. 2 is a plan view of a steering handle of the watercraft of FIG. 1.

With reference to FIG. 2, in the vicinity of a grip 12b on the right side (on the starboard side) of the steering handle 12 is provided a throttle lever 21 for rotation about its base-end side portions, although other configurations can also be used. The throttle lever 21 is movable toward the grip 12b through a driver's operation, with, for example, an operator's finger, although other configurations can also be used. When the lever 21 is not being depressed, the lever is held separated from the grip 12b, by a spring, for example. In the base section of the throttle lever 21 is provided an amount-of-operation sensor 21a for detecting the amount of operation (amount of rotation) of the throttle lever 21. The sensor 21a can be any type of sensor. One type of sensor that can be used is, for example, but without limitation, a rheostat configured to output a voltage indicative of the angular position of the lever 21a, however, other sensors can also be used.

The watercraft 10 can also include a steering angle sensor 12c configured to detect an angular displacement of the steering handle 12. For example, the steering angle sensor 12c can be mounted in the vicinity of the steering shaft 12a and configured to detecting the rotational angle of the steering shaft 12a (steering handle 12), and or the angular velocity of the steering handle. However, other sensors can also be used.

With reference to FIG. 1, in the bottom of the body 11 at the forward portion thereof is disposed a fuel tank 14 for storing fuel. In the bottom of the hull 11b at the middle portion thereof is disposed an engine 22.

To the engine 22 are connected an intake device 18 for sending a mixture of air and fuel supplied from the fuel tank 14, and an exhaust device 19 for discharging exhaust gas delivered from the engine 22, from the rear end of the body 11 to the outside.

Figure 3:
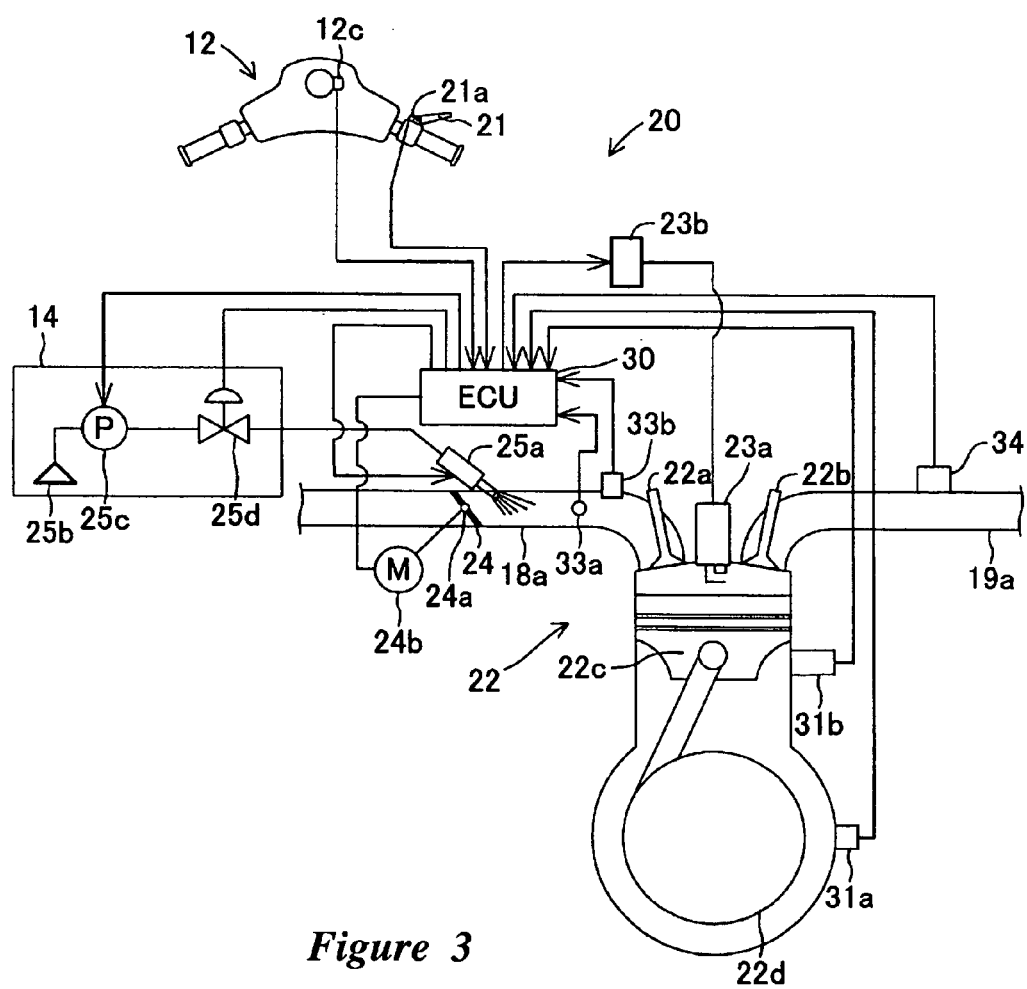
FIG. 3 is a schematic diagram of the engine control device.

In the illustrated embodiment, the engine 22 is a four-stroke, four-cylinder type. However, this is merely one type of engine that can be used with the present inventions. Engines having a different number of cylinders, other cylinder arrangements, various cylinder orientations (e.g., upright cylinder banks, V-type, and W-type), and operating on various combustion principles (e.g., four stroke, crankcase compression two-stroke, diesel, and rotary) are all practicable for use with the inventions disclosed herein. As shown in FIG. 3, the engine 22 draws in through an intake valve 22a, a mixture of fuel and air from the intake device 18 provided on the side of the intake valve 22a. Additionally, the engine 22 discharges exhaust gasses through an exhaust valve 22b, to the exhaust device 19 provided on the side of the exhaust valve 22b.

The fuel and air mixture supplied into the engine 22 through the intake valve 22a is ignited through activation of an ignition device. The ignition device can be any type of ignition device or system. In the illustrated embodiment, the ignition device comprises an ignition or "spark" plug 23a provided on the engine 22.

When the air/fuel mixture is ignited, the mixture combusts and thus causes a piston 22c provided in the engine 22 to make an up and down movement. The movement of the piston 22c causes a crankshaft 22d to rotate. The crankshaft 22d is connected to an impeller shaft 16 through a direct connection or through one or a plurality of additional shafts. As such, the rotational force of the engine 22 is transmitted to the impeller shaft 16 to rotate an impeller (not shown) that is connected to the impeller shaft 16.

The impeller is part of a propulsion device 15 disposed at the rear end of and generally along a longitudinal centerline of the body 11. The rotation of the impeller produces a propulsive force for the water-jet propulsion boat 10. That is, the propulsion device 15 is provided with a water induction port 15a open toward the bottom of the boat body 11. A water ejection port (not shown) propulsion device 15 is open at the stern. Water introduced from the water induction port 15a is jetted out from the water ejection port through rotation of the impeller to produce a propulsive force for the boat body 11.

A steering nozzle 17 is attached to the rear end of the propulsion device 15. The steering nozzle 17 is configured to deflect the water jet ejected from the propulsion device 15 so as to change a running direction of the watercraft 10 to the left and right by moving its rear portion to the left and right in response to the operation of the steering handle 12.

The intake device 18 can include an intake pipe 18a connected to the engine 22, a throttle body 18b connected to the upstream end of the intake pipe 18a, and the like. Air outside the boat body 11 is drawn through an intake air duct 18c and an intake box 18d. The flow of such air can be regulated by opening/closing of a throttle valve 24 provided in the throttle body 18b. As air flows through the intake pipe 18a, it is mixed with fuel. The fuel can be supplied from the fuel tank 14 through a fuel feed device made up of an injector 25a and the like. This type of fuel injection system is known as "port" fuel injection. Other types of fuel injection systems, such as, for example, but without limitation, direct fuel injection, can also be used.

The exhaust device 19 includes an exhaust pipe 19a that can comprises bent pipes connected to the engine 22. A tank-like water lock 19b can be connected to the rear end of the exhaust pipe 19a, so as to suppress water from flowing upstream through the exhaust system.

An exhaust pipe 19c can be connected to the rear of the water lock 19b. The exhaust pipe 19a can extend initially forwardly. In the illustrated engine, one exhaust pipe 19a is provided for each cylinder of the engine 22. These individual exhaust pipes 19a are grouped together on the starboard side of the engine 22, and extend around the front side of the engine 22 toward the port side. On the front or port side of the engine 22, the individual pipes 19a can be merged together to form a common exhaust passage. The common exhaust passage can extend further rearwardly from the read side of the engine 22. However, this is merely one exemplary configuration of the exhaust system. Other configurations can also be used.

The rear end of the common exhaust passage 19a is in communication with the front of the water lock 19b. The exhaust pipe 19c extends rearward from the rear top surface of the water lock 19b. The exhaust pipe 19c first extends upwardly from the rear top surface of the water lock 19b and then downwardly to the rear, the downstream end of which opens to an undersurface of the body 11, near the rear end. One such undersurface can be a side wall of a tunnel in which the propulsion device 15 is disposed. The exhaust device 19 discharges exhaust gas to the outside, with outside water or the like prevented from entering into the engine 22.

In the illustrated embodiment, the throttle valve 24 is formed in the shape of a disc, to the central portion (in its diametric direction) of which is fixed a rotational shaft 24a. The rotational shaft 24a is supported inside the throttle body 18b for rotation, to one end of which is connected a motor 24b. Therefore, the throttle valve 24 rotates in normal and reverse directions on the rotational shaft 24a in association with the rotation of the motor 24b, to open/close the intake air passage in the throttle body 18b.

Figure 4:
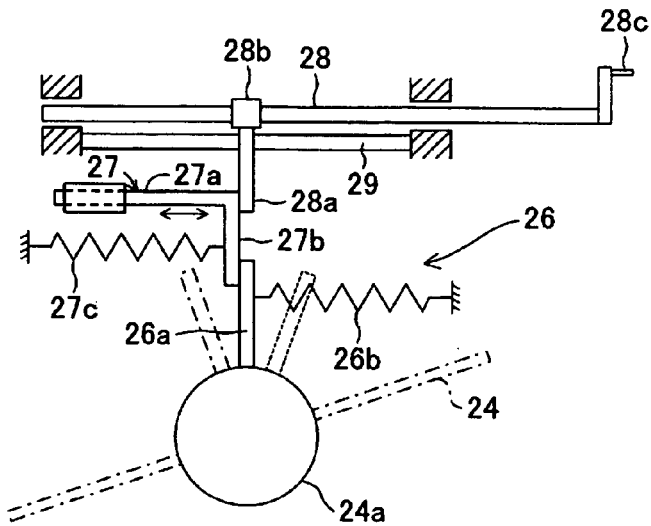
FIG. 4 is a schematic diagram of a limp home mechanism that can be used with the engine control device of FIG. 4.

With reference to FIG. 4, the watercraft 10 can also include a limp home mechanism 26. The limp home mechanism 26 can be configured to acts as a means of performing a limp home function when the motor 24b fails to adjust throttle opening to a desired amount. For example, but without limitation, the motor 24b might fail to properly adjust the throttle valve 24 due to an energization abnormality or the like due to breaking of wire of the motor 24b and the like.

The limp home mechanism 26 can include an engagement piece 26a formed on the outer circumferential surface of the rotational shaft 24a at a predetermined location. The engagement piece 26a can be connected to a spring 26b for biasing the throttle valve 24 toward an open position (counterclockwise as viewed in FIG. 4). On a surface opposite to that of the engagement piece at the forward end to which is connected the spring 26b, is provided an L-shaped sliding portion 27 movable in the tangential direction (in the direction parallel to the extending direction of the spring 26b) of the rotational shaft 24a while in contact with the engagement piece 26a.

The sliding portion 27 can comprise a horizontal piece 27a and a vertical piece 27b. The vertical piece 27b is connected to a spring 27c for biasing the throttle valve 24 toward its closing direction (clockwise in FIG. 4). The spring constant of the spring 27a is set larger than that of the spring 26b. Therefore, the spring 27c biases the throttle valve 24 clockwise against the reaction force of the spring 26b.

Above the throttle valve 24 in FIG. 4, a screw shaft 28 is disposed parallel to the moving direction of the sliding portion 27. A bar-like engagement piece 28a is mounted to the screw shaft 28 through a nut 28b. The engagement piece 28a is connected to the nut 28b, and the nut 28b is fitted on the screw shaft 28 to be movable in the axial direction thereof. Therefore, contact of the forward end of the engagement piece 28a with the sliding portion 27 stops the sliding portion 27, so that the rotation of the throttle valve 24 in the clockwise direction can be restricted.

Under the screw shaft 28 and parallel to the screw shaft 28, is disposed a guide bar 29 for restricting the rotation of the engagement piece 28a. At one end of the screw shaft 28 is provided an operating handle 28c. Thus, rotational operation of the operating handle 28c allows the engagement piece 28a to move in the axial direction of the screw shaft 28, with its rotation prevented by the guide bar 29.

In the limp home mechanism 26 as described above, the opening of the throttle valve 24, when the motor 24b is not energized, is set to be an angle capable of securing the minimum amount of intake air required at the time of limp home. Adjustment of the throttle opening is performed through rotational operation of the operating handle 28c in this case.

The engine control device 20 according to this embodiment is provided, in addition to the foregoing devices, with various devices such as an electronic control unit 30 (hereinafter referred to as an ECU) and the like and various kinds of sensors. In the fuel tank 14, a filter 25b, a fuel pump 25c and a pressure control valve 25d are disposed. The pressure control valve 25d is connected to the injector 25a, controlling the pressure of fuel whose impurities are filtered and removed by the filter 25b and which is fed to the injector 25a through operation of the fuel pump 25c.

To the ignition plug 23a is connected an ignition coil 23b, which sends an electric current to the ignition plug 23a in synchronization with the ignition timing. Thus, the ignition plug 23a ignites fuel through discharging.

In the vicinity of the crankshaft 22d in the engine 22 is provided a rotational speed sensor 31a for detecting the rotational speed of the crankshaft 22d. In the body of the engine 22 is provided a temperature sensor 31b for detecting the temperature of the engine body. In the vicinity of the rotational shaft 24a of the throttle valve 24 is provided a throttle opening sensor 32 (see FIG. 5) for detecting the opening of the throttle valve 24.

In the intake pipe 18a are provided an intake air pressure sensor 33a for detecting the intake air pressure inside the intake pipe 18a and an intake air temperature sensor 33b for detecting the intake air temperature inside the intake pipe 18a. In the exhaust pipe 19a is provided an exhaust air-fuel ratio sensor 34 for detecting the air-fuel ratio in the exhaust pipe 19a.

Figure 5:
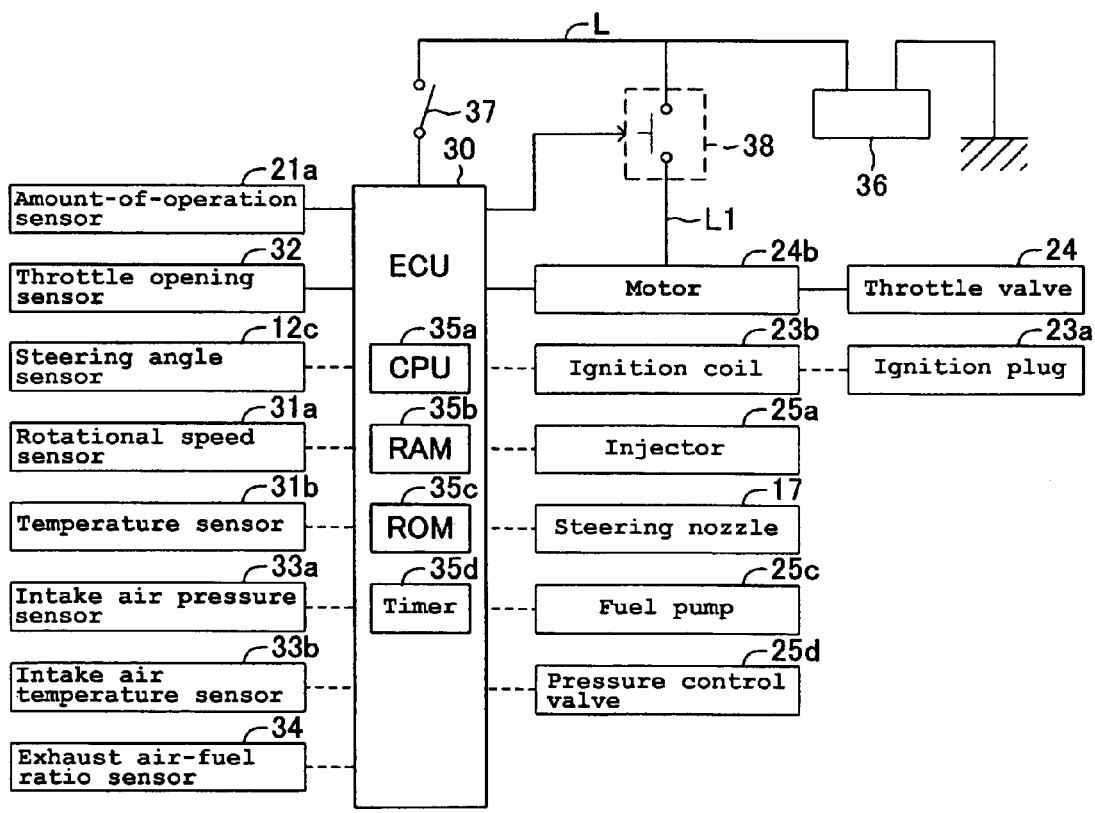
FIG. 5 is a block diagram of the engine control device.

The ECU 30 can include a CPU 35a, a RAM 35b, a ROM 35c, a timer 35d and various kinds of circuitry devices (not shown), as shown in FIG. 5. Detection signals can be input from an amount-of-operation sensor 21a which indicates the condition of operation of the throttle lever 21 and the rotational speed sensor 31a which indicates the rotating condition of the engine 22. The ECU 30 can be configured to process the detection signals from these sensors based on a control map stored in the ROM 35c, transfers control signals to the injector 25a, ignition coil 23b, motor 24b, fuel pump 25c, pressure control valve 25d and the like, for the control of fuel injection or ignition timing, as well as of opening of the throttle valve 24. That is, the ECU 30 functions as the mode judgment means, ignition timing control device and fuel injection control device according to one embodiment.

The ECU 30 is connected to a battery 36 through a power source line L having an ignition switch 37 therein. The ignition switch 37 is changed over between ON and OFF through driver's operation, and when it is set ON, power is supplied to the ECU 30. The battery 36 is connected to the motor 24b through the power source line L1, having a relay 38 therein. The relay 38 is changed over between ON and OFF based on the signal sent from the ECU 30, and when it is set OFF, power supply path (power source line Li) of the motor 24b is cut off, stopping energization of the motor 24b.

During operation, an operator can start the water-jet propulsion boat 10. If the driver sets a main switch (not shown) ON and also manipulates the ignition switch 37 to an ON position, then the watercraft 10 is brought into the condition for running; the engine 22 is running at least at idle speed. In this case, the relay 38 is set to be ON and the motor 24b is in the condition for operation.

Figure 6:
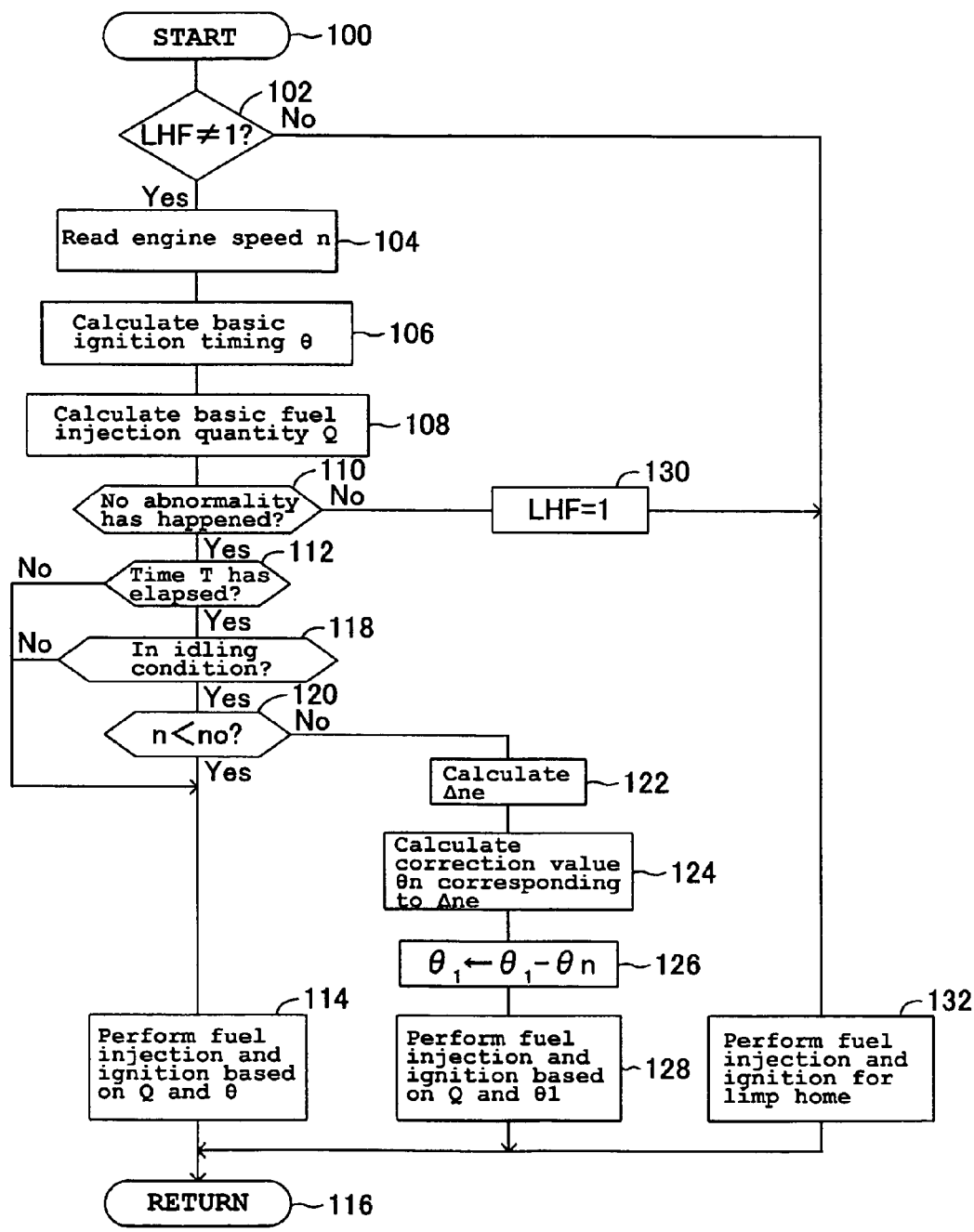
FIG. 6 is a flowchart illustrating a program that can be used in conjunction with the engine control device, or other engine control devices for controlling ignition timing of an engine.

Control of the engine 22 can be performed according to a program illustrated in flowchart form in FIG. 6. The program can optionally be repeated at given time intervals after the ignition switch 37 is set ON.

The program is started in Step 100. Then, the program proceeds to Step 102 and the CPU 35a determines whether or not the limp home flag LHF has been set to "1." The limp home flag LHF indicates that an abnormality has occurred related to the control of throttle valve 24. In some embodiments, an abnormality is indicated when the LHF flag is set to "1", an normal operation is indicated when the LHF flag is set to "0". The limp home flag LHF can optionally be reset to "0" when execution of the program is started. If in Step 102, it is determined that the LHF flag is "1", resulting in a "YES" determination, the program proceeds to Step 104.

Figure 7:
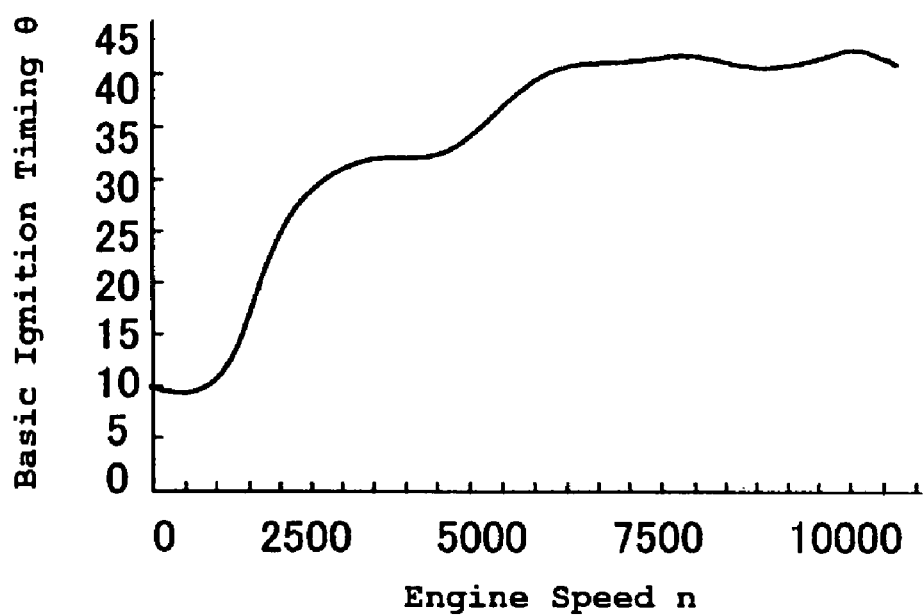
FIG. 7 is a graph illustrating an exemplary relationship between engine speed and basic ignition timing.

In Step 104 the engine speed n detected by the rotational speed sensor 31a is read and then stored temporarily in the RAM 35b. Then, the program proceeds to Step 106 and calculates the basic ignition timing $\theta$. In some embodiments, the basic ignition timing can be in the form of a map and stored in the ROM 35c. FIG. 7 illustrates an exemplary but non-limiting embodiment of a basic ignition timing map that can be used with the present program. However, other maps can also be used. In the illustrated map, the basic ignition timing $\theta$ is determined based on the engine speed n (rpm).

Through the basic ignition timing-calculation map, a basic ignition timing θ can be calculated for an optimum engine speed n at the time of engine start. The value of the basic ignition timing θ calculated in the procedure in Step 106 is stored in the RAM 35b. The basic ignition timing θ is a timing (often expressed as degrees of rotation relative to Top Dead Center) at which a mixture supplied to the engine 22 is ignited by the ignition plug 23a. Supposing that the angle of the top dead center of the piston 22c is defined as zero, the timing is shown by an angle before the top dead center.

The program then can proceed to Step 108. In the step 108, a basic fuel injection quantity Q can be determined. The basic fuel injection quantity Q can be prepared in advance and stored in the RAM 35b as a basic fuel injection quantity-calculation map (not shown). Such a basic fuel injection quantity Q can be determined based on the basic fuel injection quantity-calculation map. The basic fuel injection quantity Q can be an amount of injection of the fuel supplied from the injector 25a to the engine 22, and the basic fuel injection quantity-calculation map is one in which values determined from the throttle opening detected by the throttle opening sensor 32 and the engine speed detected by the rotational speed sensor 31a are represented as a map and which is prepared in advance. Therefore, a basic fuel injection quantity Q can be calculated capable of establishing an optimum engine speed n from the condition of the engine 22. The basic fuel injection quantity-calculation map can also be prepared based on the intake air suction vacuum and the engine speed, and it may be one in which the required amount of fuel in response to the amount of air drawn by the engine 22 is represented as a map.

The calculated value of the basic fuel injection quantity Q is also stored in the RAM 35b. In this case, calculation of the fuel injection timing is also performed together with the calculation of the basic fuel injection quantity Q, though not shown in the flowchart of FIG. 6. Then, the program proceeds to Step 110 and the CPU 35a determines whether or not an abnormality has happened in the control of throttle opening. Here, a judgment can be made as to whether or not normal throttle opening control of the throttle valve 24 has been performed. The judgment of this abnormality can be made by determining whether improper control of throttle opening has been performed as a result of the breaking of wire or the failure in devices such as the amount-of-operation sensor 21a and the like connected to the ECU 30 by solid lines in FIG. 5 or whether proper control has been performed.

Though omitted in the flowchart of FIG. 6, for example, the absolute value of the value of the amount of operation of the throttle lever 21 detected by the amount-of-operation sensor 21a subtracted from the value of throttle opening detected by the throttle opening sensor 32, is calculated as an amount of change, and a judgment is made from whether or not this amount of change is larger than a given predetermined threshold of abnormality judgment. If the amount of change is smaller than the threshold of abnormality judgment, it is judged that no abnormality has happened. Here, it is assumed that no abnormality has happened, the procedure is judged to be "YES" and the program proceeds to Step 112.

At step 112, a determination is made as to whether or not a specified time T has elapsed. Here, a judgment is made on the lapse of time from the start of the program after the ignition switch 37 is set ON, and the specified time T is set as a time required for changes of the engine speed from a starting mode to a normal mode after the start of the engine 22. Here, if the specified time T has not been elapsed, it is judged to be "NO" and the program proceeds to Step 114.

In Step 114, fuel can be injected with the injector 25a, the amount of injection being based on the basic fuel injection quantity Q calculated in the procedure in Step 108. Additionally, the ignition plug 23a can be powered to provide an ignition spark at a timing based on the value of the basic ignition timing θ calculated in the procedure in Step 106. As such, the engine 22 runs under a starting mode. Then, the program proceeds to Step 116 to be stopped for the time being.

The program is started again in Step 100 and proceeds to Step 102, where it is judged whether or not the limp home flag LHF is "1." Since the limp home flag LHF still remains at "1," it is judged to be "YES" in Step 102 and the program proceeds to Step 104. Then, the same procedures as those at the foregoing steps, Step 104-Step 112, are carried out to update the value of the engine speed n previously determined, and calculations of the basic ignition timing θ, basic fuel injection quantity Q and basic fuel ignition timing are performed. These updated values can be stored in the RAM 35b.

Then, the program proceeds to Step 110, where a determination is made on whether or not an abnormality has happened in the control of throttle opening. Here, if no abnormality has happened and the procedure is judged to be "YES," the program proceeds to Step 112, where a determination is made on whether or not a specified time T has been elapsed. If the specified time has not been elapsed, it is judged to be "NO" and the program proceeds to Step 114, followed by the foregoing procedures of Step 114 and Step 116, and the program is started again in Step 100.

In this case, the procedure carried out in Step 114 is to inject fuel from the injector 25a based on the basic fuel injection quantity Q calculated in the procedure in Step 108 of the latest step of the program and to control the ignition timing of the ignition plug 23a based on the value of the basic ignition timing θ calculated in the procedure in Step 106. The foregoing procedures are repeated until in Step 112 it is judged to be "YES" after a specified time T has been elapsed.

If it is judged to be "YES" in Step 112 after the specified time T has been elapsed and the engine speed is changed from a starting mode to a normal mode, the program proceeds to Step 118, where a judgment is made on whether or not the rotation of the engine 22 is in an idling condition. This idling condition is one in which the throttle lever 21 operated by a driver is at a position for the lowest output, and this condition is judged from the output value of the amount-of-operation sensor 21a. If the rotation is not in an idling condition, it means that the driver is operating the throttle lever 21 intentionally, therefore it is judged to be "NO" and the program proceeds to Step 114. Thereafter, procedures of the foregoing steps, Step 114 and Step 116, are carried out and the program is started again in Step 100.

If the result of the determination in Step 118 is "YES", the program proceeds to Step 120. In the Step 120, a determination is made as to whether or not the latest engine speed n stored in the RAM 35b is smaller than a target engine speed n0. The target engine speed n0 is one which is determined in advance as an ideal rotational speed of the engine 22 and stored in the ROM 35c, and the CPU 35 controls the engine speed n to a value close to the target engine speed n0 when the engine speed n exceeds the target engine speed n0. Here, if the engine speed n is smaller than the target engine speed n0 and it is judged to be "YES," then the program proceeds to Step 114.

The CPU 35 carries out again the procedure of fuel injection and ignition in Step 114, and the program proceeds to Step 116 and terminated. Thereafter, procedures of the foregoing steps are repeated, and if the engine speed n becomes larger than the target engine speed n0 and it is judged to be "NO" in Step 120, the program proceeds to Step 122.

In Step 122, the difference Δne between values of the engine speed n and the target engine speed n0 is obtained. At step 124, a correction value θn of the basic ignition timing θ corresponding to the difference Δne is calculated. Calculation of the correction value θn in this case is also performed based on a map (not shown) prepared in advance. The values in such a map are determined to so as to change the ignition timing so as to slow the engine speed, e.g., ignition timings that provide less ideal combustion.

Then, the program proceeds to Step 126, and after the value of the correction value θn subtracted from the latest basic ignition timing θ1 is updated as a retarded ignition timing θ1, the program proceeds to Step 128. In Step 128, fuel injection and ignition are performed based on the updated ignition timing θ1. In this case, fuel injection is performed based on the values of the basic fuel injection quantity Q and the basic fuel injection timing determined in the procedure of the latest step, Step 108.

If fuel injection and ignition are completed, then the program proceeds to Step 116 to be terminated. The program is started again in Step 100, and until the updated engine speed n becomes smaller than the target engine speed n0 and it is judged to be "YES" in Step 120, procedures of Step 122-Step 128 are repeated and the ignition timing θ1 is retarded by a correction value On for each procedure for the updating. Each time, fuel injection is performed based on the values of the basic fuel injection quantity Q and the basic fuel injection timing determined by the procedure at the latest step, Step 108, as well as ignition based on the ignition timing θ1 updated by the procedure in Step 126.

If an abnormality occurs in the control of throttle opening and the determination in Step 110 is "NO", the program proceeds to Step 130. In Step 130, a procedure is carried out of setting the limp home flag LHF to "1." This confirms a failure. At this time, the ECU controls the relay 38 into an OFF-condition, causing the motor 24b to be in an inoperable condition. This allows the opening of the throttle valve 24 to be an opening that is set for the limp home mechanism 26.

Then, the program proceeds to Step 132, where a procedure is carried out of injecting fuel from the injector 25a and controlling the ignition timing of the ignition plug 23a, based on values of the fuel injection quantity, fuel injection timing and ignition timing determined in advance for the procedure at the time of limp home. After fuel injection and ignition are completed, the program proceeds to Step 116 to be terminated. The program is started again in Step 100, and in Step 102 a judgment is made on whether or not the limp home flag LHF is "1." However, since during previous execution of the program, the limp home flag LHF was set to "1" in Step 130, here, the procedure is judged to be "NO" and the program proceeds to Step 132.

In this step, fuel injection and ignition are performed based on the fuel injection quantity, fuel injection timing and ignition timing at the time of limp home. This enables running of the watercraft 10 through engine control corresponding to the limp home even if an abnormality happens in the control of throttle opening. Thereafter, the procedure of Step 132 is repeated until the ignition switch 37 is set OFF and the engine 22 is stopped.

As described above, in the engine control device 20 according to this embodiment, since the basic ignition timing θ is adjusted toward a retarded timing when the engine speed is changed from a starting mode to a normal mode, an abrupt rise in engine speed n is prevented. At this time, since the ignition timing θ1 is controlled in response to the difference Δne between the engine speed n detected by the rotational speed sensor 31a and a predetermined target engine speed n0, the engine speed n can be maintained in a condition close to a predetermined proper speed, preventing noise due to an abrupt change in engine speed n. In addition, since cylinder deactivation is not used, the possibility of damaging the engine 22 is eliminated.

A further advantage is provided where it is determined whether or not the engine is idling. For example, when the idling judgment device judges that the engine rotation is in an idling condition, the retard position control of the ignition timing is started by the ignition timing control device. The idling condition is one in which an operator intentionally operates the engine such that it is driven at a lowest output, for example, when the operator does not manipulate the throttle lever 21. An alternative condition is one in which the operator intentionally operates the engine such that it is driven at a higher output, such as when the operator depresses or pulls on the throttle lever 21. Therefore, when the operator is manipulating the throttle lever 21, or another device that can raise the output of the engine, no ignition retarding is performed. An amount-of-operation sensor, which is generally provided in a vehicle equipped with an engine for detecting the amount of operation of a control piece (e.g., throttle lever 21) manipulated by an operator, an idling judgment switch, a throttle position sensor for detecting the rotation angle of a throttle valve, or the like can be used as the idling judgment device.

Yet another advantage is provided by including a determination is a predetermined period of time has elapsed. For example, in some embodiments, the engine control device includes a timer, and the retard position control is performed after the time measured by the timer exceeds a specified time required for a change of the engine condition from the start of its operation to the normal mode. The specified time can be a time required for the engine to experience its first detonation after cranking, although other specified time periods can also be used.

Figure 8:
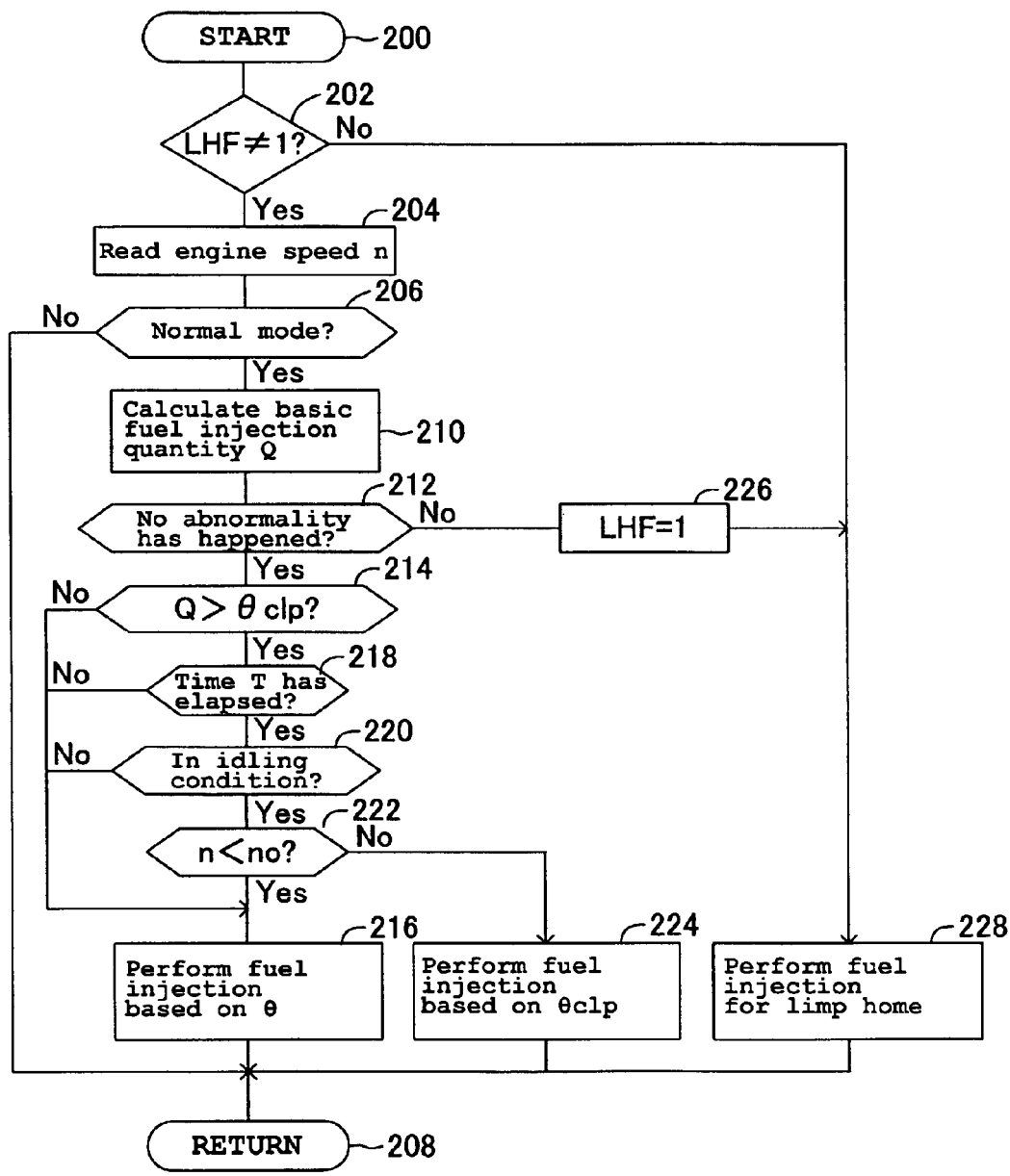
FIG. 8 is a flowchart illustrating a program than can be used with the engine control device of FIG. 4 or other engine control devices for controlling the fuel injection.

In the flowchart of FIG. 8, an embodiment is shown in which fuel injection is controlled, in place of ignition timing, to suppress the engine speed. This program is started in Step 200. After the Step 200, the program proceeds to Step 202.

In the Step 202, a determination is made as to whether the limp home flag LHF has not been set to "1." If the limp home flag LHF has not been set to "1," the result of the determination is "YES," and thus, the program proceeds to Step 204.

In the step 204, the engine speed n is detected by the rotational speed sensor 31a is read and the value is stored in the RAM 35b. Then, the program proceeds to Step 206.

In the Step 206, a determination is made as to whether the engine speed n is in a normal mode. This judgment can be made based on the engine speed n detected by the rotational speed sensor 31c and a determination as to if the engine speed n exceeds a given value. If the engine speed n is greater than the predetermined value, then it is determined that the engine speed n has been changed from a starting mode to a normal mode. Here, if the engine speed n is smaller than the given value and is in the starting mode, it is judged to be "NO" and the program proceeds to Step 208 to terminate the process. Then, the program is started again in Step 200, and procedures of Step 202 and Step 204 are repeated until the engine speed n exceeds the given value and it is changed from the starting mode to the normal mode.

If the engine speed n is changed to a normal mode, the result of the determination in Step 206 is "YES" and the program proceeds to Step 210, where the basic fuel injection quantity Q is calculated. Procedures of this step, Step 210, and the next step, Step 212, are the same as those of Step 108 and Step 110 in the flowchart of FIG. 6 and thus the description is omitted.

If no abnormality is found in the control of throttle opening and the procedure is judged to be "YES" in Step 212, the program proceeds to Step 214, where the CPU 35a determines whether or not the basic fuel injection quantity Q determined in the procedure of Step 210 is larger than an upper limit value Qclp of the threshold of fuel injection quantity just after starting.

The upper limit value Qclp of the threshold of fuel injection quantity just after starting is an upper limit value determined in advance, and if a basic fuel injection quantity Q at starting exceeds the upper limit value Qclp of the threshold of fuel injection quantity just after starting, it is judged that an excessive fuel injection quantity is required. If the basic fuel injection quantity Q is smaller than the upper limit value Qclp of the threshold of fuel injection quantity just after starting, the procedure is judged to be "NO" in Step 214, and the program proceeds to Step 216. In Step 216, a procedure is carried out of injecting fuel from the injector 25a based on the basic fuel injection quantity Q calculated in the procedure of Step 210. In this case, regarding the ignition timing, a basic ignition timing θ is determined by the same procedure as the foregoing step, Step 106, and ignition is performed based on the basic ignition timing θ, though the description is omitted. Then, the program proceeds to Step 208 and stops for the time being.

The program is started again in Step 200 and proceeds to Step 202, and thereafter, Step 202-Step 206 and Step 210-Step 214 are repeated. Thus, the values of the engine speed n and basic fuel injection quantity Q previously determined are updated and the updated values are stored in the RAM 35b. If the basic fuel injection quantity Q becomes larger than the upper limit value Qclp of the threshold of fuel injection quantity just after starting and it is judged to be "YES" in Step 214, the program proceeds to Step 218. Step 218-Step 222 are the same as those of Step 112, Step 128 and Step 120 in the flowchart of FIG. 6 and the description is not therefore repeated.

If it is judged to be "NO" in Step 218 and Step 220 or "YES" in Step 222, in Step 216 a procedure is carried out of injecting fuel from the injector 25a, as well as ignition, based on the basic fuel injection quantity Q calculated in Step 210 during the latest execution of the program. Then, the program proceeds to Step 208 and stops for the time being. If engine speed n becomes larger than a target engine speed n0 and it is judged to be "NO" in Step 222, the program proceeds to Step 224.

In Step 224, fuel injection is performed based on the upper limit value Qclp of the threshold of fuel injection quantity just after starting. In this case, regarding the ignition timing, as in the previous case, ignition is performed based on the basic ignition timing Q. If fuel injection and ignition are completed, the program proceeds to Step 208 and terminates. The program is started again in Step 200, and until the updated engine speed n becomes smaller than the target engine speed n0 and it is judged to be "NO" in Step 222, the procedure of Step 224 is repeated.

If an abnormality has happened in the control of throttle opening and the procedure is judged to be "NO" in Step 212, the program proceeds to Step 226. In Step 226, a procedure is carried out of setting the limp home flag LHF to "1." This confirms a failure. Then, the program proceeds to Step 228, where a procedure is carried out of injecting fuel from the injector 25a, as well as ignition, based on values of the fuel injection quantity and ignition timing determined in advance for the limp home condition. After fuel injection and ignition are completed, the program proceeds to Step 208 and terminates. The procedure of Step 228 is repeated until the ignition switch 37 is set OFF.

As described above, according to the embodiment, since an upper limit is established for the fuel ignition quantity, it is prevented from becoming too large, suppressing the engine speed effectively and in such a manner that the possibility of damaging the engine is lowered. In addition, since in the water-jet propulsion boat 10 with the engine control device 20, the engine speed at starting can be controlled to a predetermined target engine speed, effecting a stable start without noise and vibration.

In other words, in an engine, control is usually performed such that the fuel injection quantity is changed in response to the change in engine speed, and a larger amount of fuel is required immediately after starting than at the time of normal operation. In addition, the fuel injection quantity fluctuates and is not in a stable condition at the time of engine start. Therefore, setting an upper limit to the fuel injection quantity prevents the fuel injection quantity from becoming too large and the engine speed can be suppressed effectively and in such a manner that the possibility of damaging the engine is lowered.

Additionally, in embodiments including a watercraft, the engine speed of the watercraft at starting is controlled to a value near the predetermined target engine speed. As a result, the watercraft can be started stably without producing excessive noise and vibration.

In addition, the engine control device 20 is not limited to the foregoing embodiments, but may be changed as appropriate for other implementations. For example, although in the foregoing embodiments, the throttle valve is described as being an electronic throttle valve using electronic control, a mechanical throttle valve connected to a throttle lever with a cable or the like may be used as the throttle valve. Further, a procedure may be included in the program shown in FIG. 6, in which if the basic fuel injection quantity Q becomes larger than the upper limit value Qclp of the threshold of fuel injection quantity just after starting as shown in the program of FIG. 8, the fuel injection quantity is reduced to the upper limit value Qclp of the threshold of fuel injection quantity just after starting. This allows a more effective control because the engine speed can be suppressed by both of the ignition timing control and the control of fuel injection quantity.

In some of the above-described embodiments, at the time of engine start when the engine speed is changed from a starting mode to a normal mode, ignition timing control is performed in response to the difference between the engine speed detected by the rotational speed detection device and a predetermined target engine speed. Thus, the engine speed can be brought close to a proper and predetermined condition, reducing noise or vibration that is commonly created due to an abrupt change in the engine speed. The "starting mode" is used herein to mean a mode (engine speed is larger than a given value (n1) and smaller than a given value (n2)) between an engine stopping mode (engine speed is smaller than a given value (n1)) and a normal mode (engine speed is larger than a given value (n2)).

Although, in the foregoing embodiments, the engine control device 20 is provided on the water-jet propulsion boat 10, it can be used in other vehicles equipped with engine, such as motorcars and motorcycles, other than the water-jet propulsion boat 10. Furthermore, portions forming the engine control device according to these embodiments can also be changed of their arrangement, structures, and materials or the like as appropriate.

Although the present inventions have been disclosed in the context of certain preferred embodiments, features, aspects, and examples, it will be understood by those skilled in the art that the present inventions extend beyond the specifically disclosed embodiments to other alternative embodiments and/or uses and obvious modifications and equivalents thereof. In addition, while a number of variations have been shown and described in detail, other modifications, which are within the scope of the present inventions, will be readily apparent to those of skill in the art based upon this disclosure. It is also contemplated that various combinations or subcombinations of the specific features and aspects of the embodiments may be made and still fall within the scope of the present inventions. Accordingly, it should be understood that various features and aspects of the disclosed embodiments can be combined with or substituted for one another in order to form varying modes of the present inventions. Thus, it is intended that the scope of the present inventions herein disclosed should not be limited by the particular disclosed embodiments described above.

What is claimed is:

1. An engine control device comprising:
a rotational speed detection device for detecting an engine speed of an engine;
a timer configured to measure a time from a start of the operation of the engine;
a mode judgment device that is configured to determine from a detection value of the rotational speed detection device that the engine speed has been changed from a starting mode to a normal mode; and
an ignition timing control device configured to calculate, when the mode judgment device determines that the engine speed has been changed from the starting mode to the normal mode, a difference between the detected engine speed and a predetermined target engine speed, and to retard ignition timing when the detected engine speed is larger than the target engine speed, the ignition timing control device being configured to control the ignition timing based on the calculated value;
wherein the ignition timing control device is configured to delay retarding of the ignition timing until the time measured by the timer exceeds a specified time required for a change of the engine condition from the start of its operation to the normal mode.

2. The engine control device of claim 1, further comprising an idling judgment device configured to determine whether the engine is in an idling condition.

3. The engine control device as set forth in claim 1, in combination with a water-jet propulsion boat.

4. An engine control device comprising:
a rotational speed detection device for detecting an engine speed of an engine;
a timer configured to measure a time from a start of the operation of the engine;
a mode judgment device that is configured to determine from a detection value of the rotational speed detection device that the engine speed has been changed from a starting mode to a normal mode;
an ignition timing control device configured to calculate, when the mode judgment device determines that the engine speed has been changed from the starting mode to the normal mode, a difference between the detected engine speed and a predetermined target engine speed, and to retard ignition timing when the detected engine speed is larger than the target engine speed, the ignition timing control device being configured to control the ignition timing based on the calculated value; and
an idling judgment device configured to determine whether the engine is in an idling condition, wherein the ignition timing control device is configured to retard ignition timing when the idling judgment device determines that the engine is operating under an idling condition.

5. An engine control device comprising:
a rotational speed detection device configured to detect an engine speed of an engine and to output an engine speed value;
a mode judgment device configured to determine, from the engine speed value of the rotational speed detection device, whether the engine speed has been changed from a starting mode to a normal mode; and
a fuel injection control device configured to control a fuel injection quantity supplied to the engine and to limit the fuel injection quantity to a value no larger than a predetermined upper limit of fuel injection, when the mode judgment device determines that the engine speed has changed from a starting mode to a normal mode.

6. The engine control device of claim 5, further comprising an ignition timing control device configured to for calculate, when the mode judgment device determines that the engine speed has changed from a starting mode to a normal mode, a difference between the engine speed value of the rotational speed detection device and a predetermined target engine speed, and to control the ignition timing of the engine based on the calculated difference value, wherein the fuel injection control device is configured to limit the fuel injection quantity to a value no larger than a predetermined upper limit of fuel injection while the ignition timing control device retards the ignition timing.

7. The engine control device of claim 5, further comprising means for calculating a difference between the engine speed value of the rotational speed detection device and a predetermined target engine speed.

8. The engine control device of claim 7, further comprising means for controlling the ignition timing based on the calculated difference value.

9. The engine control device of claim 5, in combination with a water-jet propulsion boat.

10. A method for controlling the speed of an engine comprising:
detecting an engine speed;
measuring with a timer a time from a start of the operation of the engine;
determining whether the engine speed has changed from a starting mode to a normal mode;
calculating a difference between the engine speed and a predetermined target engine speed; and
controlling an ignition timing of the engine based on the calculated difference between the engine speed and the predetermined target engine speed; and
determining if a throttle lever of the engine has been manipulated by an operator, wherein controlling the ignition timing comprises retarding the ignition timing only if the throttle lever is not being manipulated by an operator of the engine.

11. The method of claim 10, wherein controlling the ignition timing comprises retarding the ignition timing when the engine speed is larger than the predetermined target engine speed.

12. A method for controlling the speed of an engine comprising:
 detecting an engine speed;
 measuring with a timer a time from a start of the operation of the engine;
 determining whether the engine speed has changed from a starting mode to a normal mode;
 calculating a difference between the engine speed and a predetermined target engine speed;
 controlling an ignition timing of the engine based on the calculated difference between the engine speed and the predetermined target engine speed; and
 retarding the ignition timing when the engine speed corresponds to an idling condition of the engine.

13. A method for controlling the speed of an engine comprising:
 detecting an engine speed;
 measuring with a timer a time from a start of the operation of the engine;
 determining whether the engine speed has changed from a starting mode to a normal mode;
 calculating a difference between the engine speed and a predetermined target engine speed;
 controlling an ignition timing of the engine based on the calculated difference between the engine speed and the predetermined target engine speed; and
 retarding the ignition timing during a specified time required for a change of the engine condition from the start of its operation to the normal mode.

14. A method for controlling the speed of an engine comprising:
 detecting a speed of an engine;
 determining from the engine speed whether the engine speed has changed from a starting mode to a normal mode; and
 controlling a fuel injection quantity supplied to the engine to a value no larger than a predetermined upper limit of fuel injection when it is determined that the engine speed has changed from a starting mode to a normal mode.

15. The method of claim 14, further comprising calculating a difference between the engine speed and a predetermined target engine speed when the engine speed has changed from a starting mode.

16. The method of claim 15, further comprising controlling the ignition timing based on the calculated difference.

* * * * *

UNITED STATES PATENT AND TRADEMARK OFFICE
CERTIFICATE OF CORRECTION

PATENT NO.       : 7,273,033 B2                                        Page 1 of 1
APPLICATION NO.  : 11/082792
DATED            : September 25, 2007
INVENTOR(S)      : Yoshimasa Kinoshita It is certified that error appears in the above-identified patent and that said Letters Patent is hereby corrected as shown below:

Column 9, line 32, delete "On" and insert -- θn --, therefor.

Signed and Sealed this

Eleventh Day of November, 2008

JON W. DUDAS
*Director of the United States Patent and Trademark Office*